United States Patent [19]

Sasaki et al.

[11] Patent Number: 4,668,988

[45] Date of Patent: May 26, 1987

[54] NON-LINEAR DIGITAL EMPHASIS CIRCUIT

[75] Inventors: Takayuki Sasaki, Kanagawa; Masaaki Arai, Tokyo, both of Japan

[73] Assignee: Sony Corporation, Tokyo, Japan

[21] Appl. No.: 665,417

[22] Filed: Oct. 25, 1984

[51] Int. Cl.⁴ .............................................. H04N 5/14
[52] U.S. Cl. ..................... 358/166; 358/37; 358/315; 364/718; 333/14
[58] Field of Search ................ 358/37, 160, 166, 315, 358/316, 318, 335; 360/32; 369/88, 134; 333/14; 455/43, 72; 381/29; 307/521; 328/167; 364/718, 722

[56] References Cited

U.S. PATENT DOCUMENTS 4,193,084  3/1980  Yamagirva et al. ................. 455/43
4,451,746  5/1984  Hirose et al. ....................... 307/494
4,570,193  2/1986  Yamashita .......................... 360/33.1

Primary Examiner—Howard W. Britton
Assistant Examiner—John K. Peng

[57] ABSTRACT

A non-linear digital emphasis circuit for non-linearly emphasizing a high frequency component of an input digital video signal in accordance with an amplitude of the digital video signal. This emphasis circuit comprises: a digital filter for emphasizing the high frequency component of the digital video signal; and a memory in which a data conversion table to non-linearly compress the amplitude of the digital video signal is written and to which the digital video signal is supplied as an address input. The respective polarities of the address input of the memory and of the readout output therefrom are inverted by a polarity inverter in accordance with the polarity of the digital video signal. With this emphasis circuit, an error of the frequency characteristic and time and temperature changes thereof are not caused and no adjustment of the characteristic is needed. Also, this circuit can be formed as an integrated circuit by utilizing only digital circuits.

8 Claims, 13 Drawing Figures

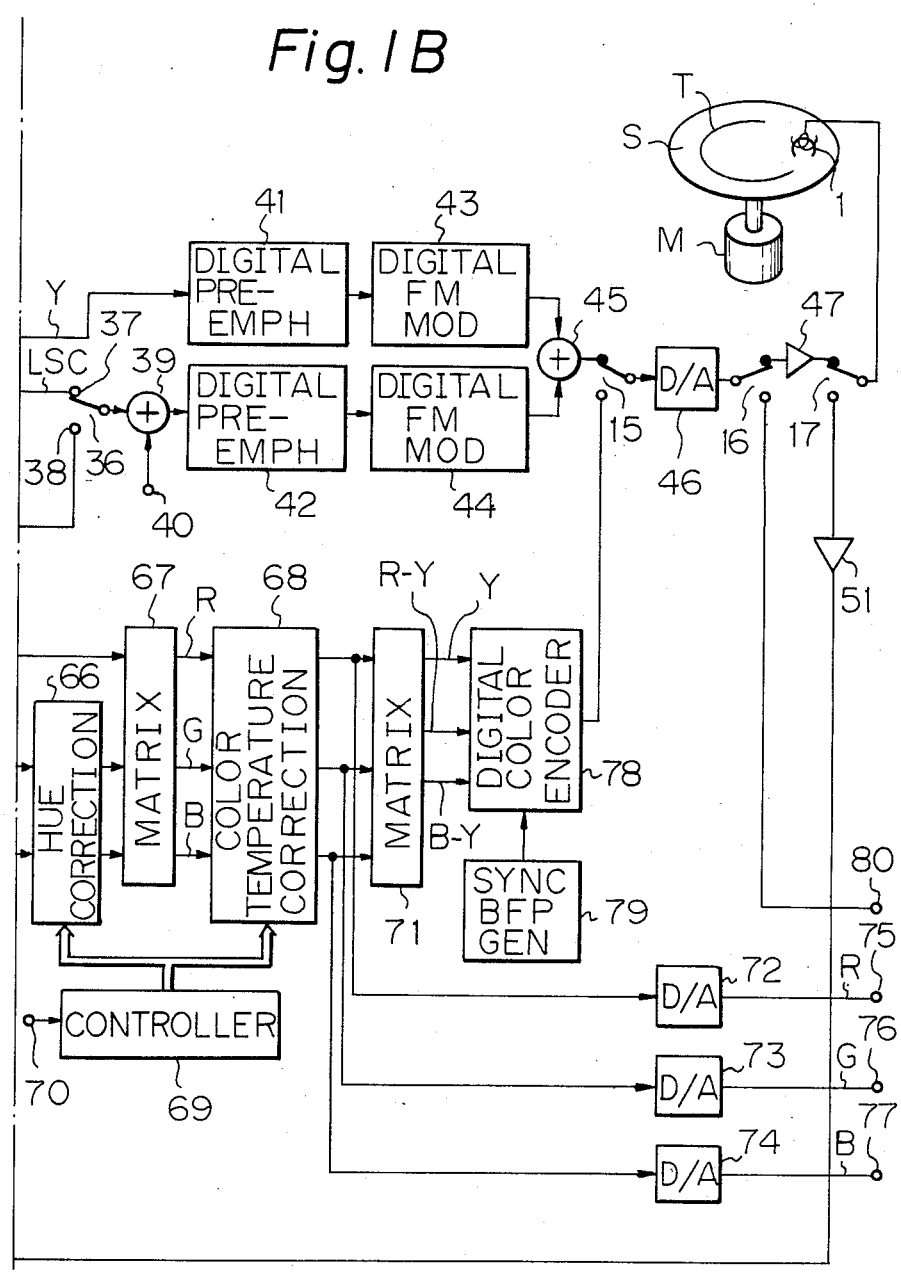

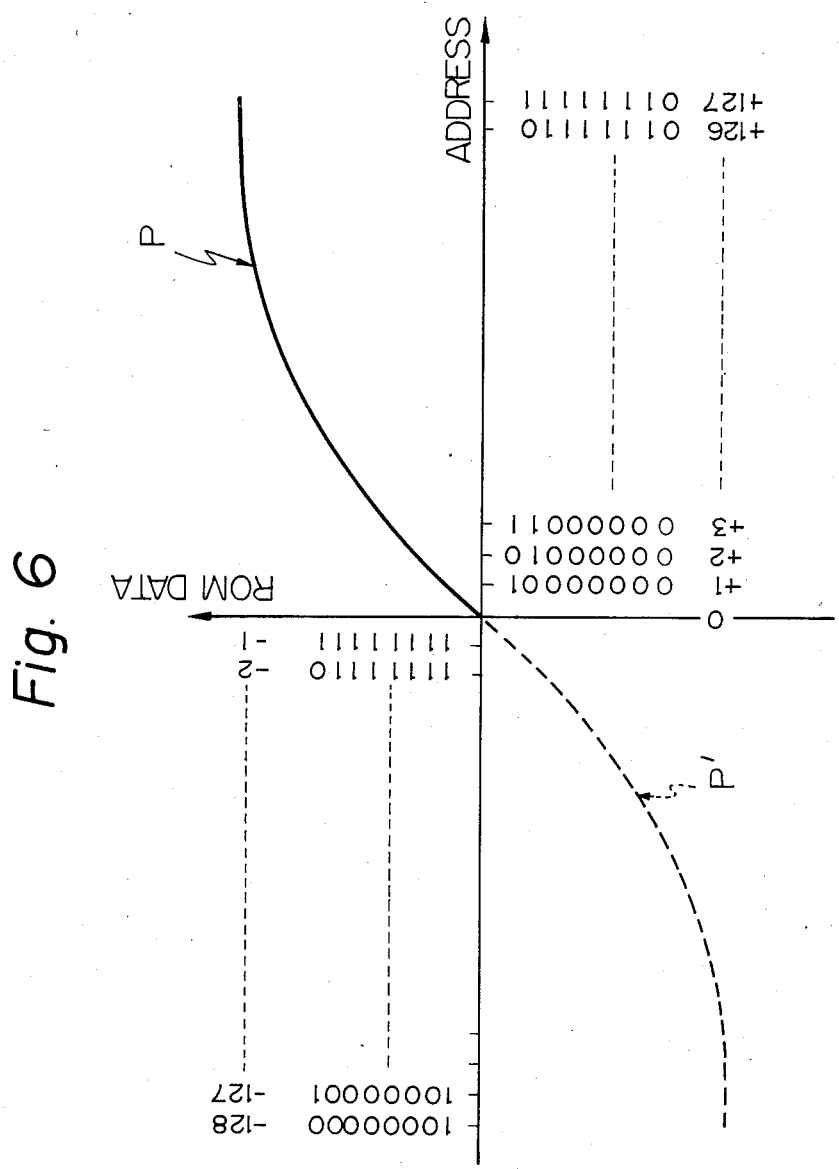

NON-LINEAR DIGITAL EMPHASIS CIRCUIT

BACKGROUND OF THE INVENTION

The present invention relates to a non-linear digital emphasis circuit which is applied to a video signal recording circuit such as a digital circuit of a VTR, for example.

In a conventional VTR, a non-linear pre-emphasis circuit is provided before an FM modulator for frequency modulating a video signal. The non-linear pre-emphasis circuit increases the emphasis amount in the region at a low level where the noise is conspicuous and decreases the emphasis amount in the region at a high level where the noise is inconspicuous in case of emphasizing the high frequency component of the video signal. A conventional non-linear pre-emphasis circuit may comprise: a pre-emphasis circuit using L (inductance) and C (capacitance) and R (resistance); and a limiter in which two diodes are connected in parallel so that their polarities are opposite.

However, a conventional analog emphasis circuit has the following drawbacks. First, an error of the pre-emphasis characteristic occurs due to a variation in values of the circuit elements and a change in pre-emphasis characteristic occurs due to a time change of the circuit elements, so that it is necessary to adjust the pre-emphasis characteristic. Secondly, since L and C parts are used and the above-mentioned adjustment is needed, the circuit scale becomes large, so that this makes it impossible to construct an integrated circuit.

SUMMARY OF THE INVENTION

It is an object of the present invention to provide a non-linear digital pre-emphasis circuit which can be easily realized as an integrated circuit arrangement without causing an error and change of the pre-emphasis characteristic.

This invention relates to a non-linear digital pre-emphasis circuit which non-linearly emphasizes the high frequency component in accordance with the amplitude of a digital video signal. A feature of this invention is that it comprises: a digital filter for emphasizing the high frequency component of the digital video signal; and a memory in which a data conversion table to non-linearly compress the amplitude of the digital video signal is written and to which the digital video signal is supplied as an address input.

The above and other objects, features and advantages of the present invention will be more apparent from the following detailed description in conjunction with the accompanying drawings.

BRIEF DESCRIPTION OF THE DRAWINGS

FIGS. 1A and 1B are a block diagram of an example of a circuit for recording and reproducing a color video signal to which the present invention can be applied;

FIGS. 6 and 7 are a schematic diagram and a block diagram which are used for explaining the digital compressing circuit, respectively;

DESCRIPTION OF THE PREFERRED EMBODIMENTS

Figure 1A:
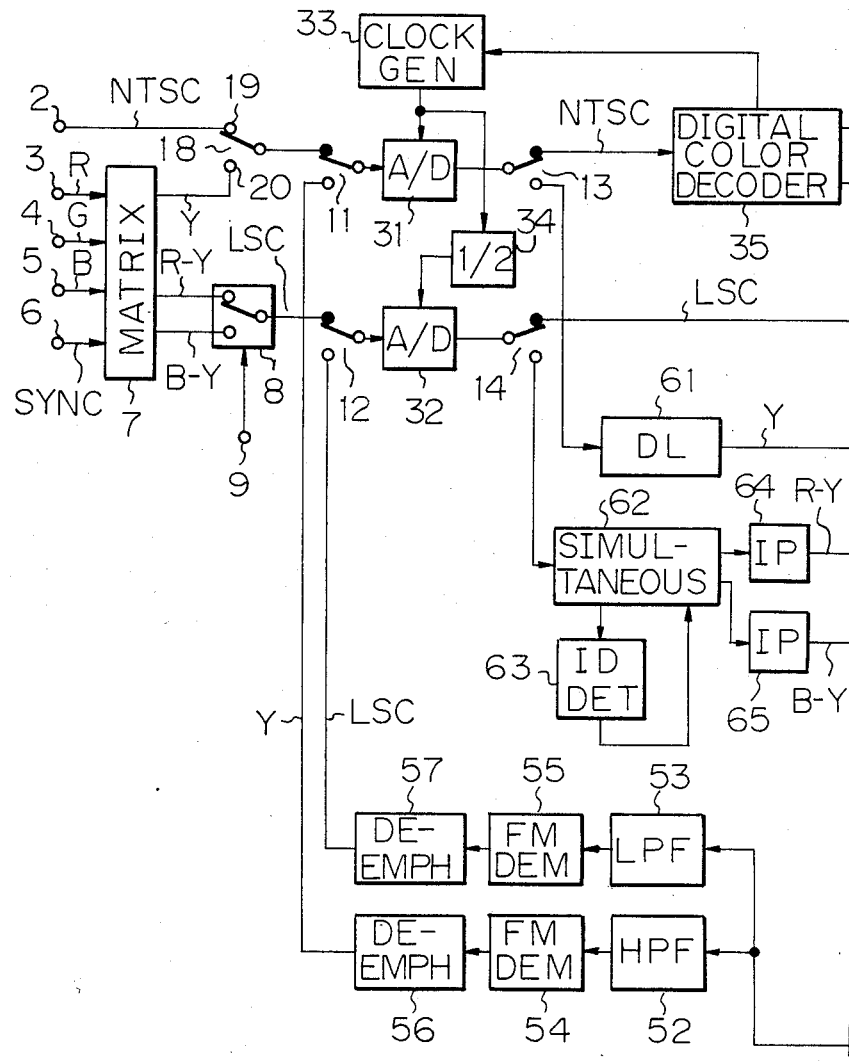

FIG. 1 shows an entire arrangement of a recording and reproducing apparatus for a color video signal to which the invention can be applied. This color video signal recording and reproducing apparatus records a color still picture signal of one frame (or one field) as one or two circular tracks T on a magnetic sheet S by a fixed magnetic head shown at 1. A magnetic sheet is enclosed in a hard shell (not shown) and is rotated by a motor M. Many tens of circular tracks can be formed on one magnetic sheet. This magnetic sheet cassette is small-sized and can be used as a recording medium for a still picture video camera.

FIG. 1 shows a signal processing arrangement when a color video signal is recorded and reproduced. This signal processing will be briefly explained hereinbelow with reference to FIG. 1.

This embodiment can record any composite color video signal of the NTSC system and component color video signals formed of three primary color signals. The composite color video signal is the main reproduced output, while the component color video signals are outputted for monitoring. A signal which is recorded on a magnetic sheet S consists of a frequency modulated luminance signal $Y_{FM}$ and a frequency modulated line sequential chrominance signal. For instance, a center frequency $f_Y$ of the signal $Y_{FM}$ is set to a predetermined frequency within a range of 6 to 7.5 MHz, a frequency modulated center frequency $f_R$ of the red color difference signal R-Y is set to, e.g., 1.2 MHz, and a frequency modulated center frequency $f_B$ of the blue color difference signal B-Y is set to, e.g., 1.3 MHz. These two color difference signals are line-sequenced such that they alternately appear at every 1 H (one horizontal period). This line-sequence conversion enables a band of the recording signal to be narrowed. The respective center frequencies of two color difference signals are offset to identify a color sequence of the line sequence.

In addition, the signal processing is substantially digitally performed, thereby allowing the operation to be stabilized and an integrated circuit arrangement to be easily realized. Furthermore, an A/D converter provided on the input side of the signal processing section and a D/A converter provided on the output side thereof are commonly used for both a recording circuit and a reproducing circuit. A D/A converter is further provided to form component color video signals for monitoring.

A signal processing arrangement for the recording and reproduction will be further described in detail with reference to FIG. 1. In FIG. 1, an NTSC color video signal is supplied to an input terminal 2; three primary color signals R, G and B are respectively supplied to input terminals 3, 4, and 5 from a color video camera, microcomputer or the like; and a composite sync signal SYNC corresponding to component color video signals consisting of these three primary color signals is supplied to an input terminal 6.

The three primary color signals are supplied to a matrix circuit 7 and are converted to the luminance signal Y, red color difference signal R-Y, and blue color difference signal B-Y. The two color difference signals outputted from the matrix circuit 7 are supplied to input terminals of a switching circuit 8 and are alternately taken out from an output terminal thereof at every 1 H in response to a switching pulse from a terminal 9. This switching circuit 8 generates a line sequential chrominance signal LSC. In FIG. 1, irrespective of a difference between the analog signal and the digital signal and a difference between the recording signal and the reproduced signal also, the luminance signal is represented by Y, the red color difference signal and blue color difference signals are indicated respectively by R-Y and B-Y, the composite color video signal is represented by NTSC, the line sequential chrominance signal is expressed by LSC, and the respective components of the three primary color signals are indicated by R, G, and B.

Numerals 11 to 17 denote recording/reproduction change-over switches, respectively. Each of these switches 11 to 17 has a recording side terminal (indicated by a black dot) and a reproducing side terminal (represented by a white circle). In FIG. 1, the switches 11–17 show the connection state upon recording. A switch 18 is switched in dependence upon the composite input and component input. The composite color video signal from the input terminal 2 is supplied to an input terminal 19 of the switch 18. The luminance signal Y from the matrix circuit 7 is supplied to an input terminal 20 of the switch 18. One signal selected by the switch 18 is supplied to an A/D converter 31 through the recording/reproduction change-over switch 11. The line sequential chrominance signal LSC from the switching circuit 8 is supplied to an A/D converter 32 through the recording/reproduction change-over switch 12.

A sampling clock at $4f_{sc}$ ($f_{sc}$: color subcarrier frequency) is supplied from a clock generator 33 to the A/D converter 31. A sampling clock of $4f_{sc}$ from the clock generator 33 is also supplied to the A/D converter 32 through a ½ frequency divider 34. Digital data in which one sample is formed of eight bits are obtained as outputs of the A/D converters 31 and 32, respectively. The clock generator 33 generates the sampling clock whose frequency and phase are synchronized with the input signal. A control data from a digital color decoder 35 is supplied to the clock generator 33. Since the color difference signals have frequency bands narrower than the frequency band of the luminance signal, they can be A/D converted at a sampling frequency of $2f_{sc}$ without causing any problem.

The output data of the A/D converter 31 is supplied to the digital color decoder 35 through the recording side terminal of the switch 13. The digital color decoder 35 performs: the processing to separate the composite color video signal into a luminance signal and a carrier chrominance signal; the processing to generate a control signal for the clock generator 33 from a burst signal included in the carrier chrominance signal; the processing to digitally demodulate the carrier chrominance signal; and the processing to convert the two chrominance signals as the demodulated outputs to the line sequential chrominance signal LSC.

The luminance signal Y from the digital color decoder 35 is supplied to a digital pre-emphasis circuit 41. The line sequential chrominance signal LSC from the digital color decoder 35 has a sampling rate of $2f_{sc}$ and is supplied to one input terminal 37 of a switch 36. The line sequential chrominance signal LSC from the A/D converter 32 is supplied through the switch 14 to the other input terminal 38 of the switch 36. The line sequential chrominance signal transmitted through the switching circuit 36 is supplied to an adder 39.

An ID data is supplied from a terminal 40 to the adder 39. This ID data has different values in dependence upon the line of the red color difference signal R-Y and the line of the blue color difference signal B-Y. Due to this ID data, the frequencies of the two color difference signals when the frequency modulation is not performed are different. An output of the adder 39 is supplied to a digital pre-emphasis circuit 42. Respective outputs of the pre-emphasis circuits 41 and 42 are supplied to digital FM modulators 43 and 44, and the modulated outputs of these modulators are mixed by a mixer 45.

An output of the mixer 45 is supplied to a D/A converter 46 through the recording side terminal of the switch 15. An analog recording signal is taken out from the D/A converter 46. This recording signal is supplied to the magnetic head 1 through the recording side terminal of the switch 16, a recording amplifier 47 and the recording side terminal of the switch 17. The recording signal is recorded on the magnetic sheet S by this magnetic head 1.

The signal reproduced from the magnetic sheet S by the magnetic head 1 is supplied through a reproducing amplifier 51 to a high-pass filter 52 and a low-pass filter 53.

The frequency modulated luminance signal is outputted from the high-pass filter 52, while the frequency modulated line sequential chrominance signal is outputted from the low-pass filter 53. Outputs of the high-pass filter 52 and low-pass filter 53 are respectively supplied to analog FM demodulators 54 and 55, and demodulated outputs thereof are respectively supplied to de-emphasis circuits 56 and 57.

The luminance signal Y outputted from the de-emphasis circuit 51 is supplied to the A/D converter 31 through the reproducing side terminal of the switch 11 and is converted to the digital signal by this A/D converter 31. The line sequential chrominance signal LSC outputted from the de-emphasis circuit 57 is supplied to the A/D converter 32 through the reproducing side terminal of the switch 12 and is converted to the digital signal by this A/D converter 32. The digital luminance signal from the A/D converter 31 is supplied to a delay circuit 61 through the reproducing side terminal of the switch 13. The digital line sequential chrominance signal from the A/D converter 32 is supplied to a simultaneous circuit 62 through the reproducing side terminal of the switch 14.

The simultaneous circuit 62 is provided such that the line sequential two color difference signals are supplied to a series connection of two 1 H delay circuits and an input and an output of the series connection of these 1 H delay circuits are added, this added output is divided by half and is outputted from first and third output terminals, and second and fourth output terminals are fetched from the connecting point of the 1 H delay circuits. A mean value of the color difference signal of one of the first and third lines among the three continuous lines is outputted from the first and third output terminals of the simultaneous circuit 62. On the other hand, the other color difference signal of the second line is outputted from the second and fourth output terminals. Therefore, the simultaneous red color difference signal R-Y can be separated by a switching circuit to select one of the first and second output terminals. The simultaneous blue color difference signal B-Y can be separated by a switching circuit to select one of the third and fourth output terminals.

An ID detecting circuit 63 is provided to allow the switching circuits of this simultaneous circuit 62 to accurately perform the operations. The ID detecting circuit 63 detects the ID data added upon recording and specifies a phase of a pulse to control the switching circuits into the correct phase in response to the ID data detected. The two color difference signals outputted from the simultaneous circuit 62 are supplied to interpolators 64 and 65. Each of these interpolators 64 and 65, for instance, interpolates a mean value of two data before and after an error data between those data. The color difference signals R-Y and B-Y of which the sampling rates were converted to $4f_{sc}$ are obtained from the interpolators 64 and 65. This conversion of sampling rate is necessary to set those sampling rates to be identical to the sampling rate of the digital luminance signal.

The digital color difference signals outputted respectively from the interpolators 64 and 65 are supplied to a hue correcting circuit (or hue controller) 66. This hue controller 66 changes values of the two color difference signals, thereby adjusting the phase, i.e., hue of the chrominance signal of which both of them were synthesized. The color difference signals outputted from this hue controller 66 and the luminance signal outputted from the delay circuit 61 are supplied to a digital matrix circuit 67. The delay circuit 61 has the same delay amount as the delays of the color difference signals which are caused in the signal lines from the simultaneous circuit 62 to the inputs of the matrix circuit 67.

The three primary color digital signals outputted from the matrix circuit 67 are supplied to a color temperature correcting circuit 68. Data for correction are supplied to the hue controller 66 and color temperature correcting circuit 68 from a controller 69 formed of a microprocessor and a memory. The temperature correcting circuit 68 and hue controller 69 can be respectively controlled by controlling the value of data. Therefore, the generation of the data for these controls from the controller 69 can be performed by use of a digital circuit technology which is substantially similar to a conventional technology. The correcting data are designated by control signals from a terminal 70. These control signals are formed by the operation of keys and levers by the operator while monitoring a hue and a color temperature of a picture monitor.

The three primary color digital signals outputted from the color temperature correcting circuit 68 are supplied to a digital matrix circuit 71 and D/A converters 72, 73, and 74. The analog component color video signals R, G, and B are outputted from respective output terminals 75, 76, and 77 of the D/A converters 72, 73, and 74. Although not shown, these component color video signals are supplied to input terminals of a color monitor image receiver.

The digital luminance signal and two color difference digital signals on which the correction for hue and color temperature was performed are supplied from outputs of the digital matrix circuit 71. Outputs of the matrix circuit 71 are supplied to a color encoder 78. In association with the color encoder 78, a synchronous and burst flag generating circuit 79 for generating a synchronizing signal SYNC and a burst flag pulse BFP is provided. The digital NTSC composite color video signal is outputted from an output of the color encoder 78 and is supplied to the D/A converter 46 through the reproducing side terminal of the switch 15. The reproduced signal in the form of the analog composite color video signal is outputted from the output of the D/A converter 46 to an output terminal 80 through the reproducing side terminal of the switch 16.

The present invention can be applied to the foregoing digital pre-emphasis circuits 41 and 42. One embodiment of the invention will be further described in detail hereinbelow.

Figure 2:
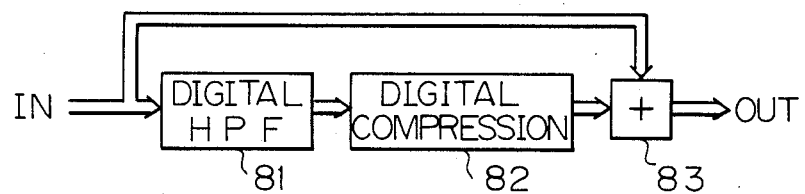
FIG. 2 is a block diagram of one embodiment of the invention.

FIG. 2 shows an example of a non-linear digital pre-emphasis circuit to which the invention is applied. For example, a digital video signal of a 2's complementary code of which one sample is formed of eight bits is supplied to a digital high-pass filter 81. The output of the digital high-pass filter 81 is supplied to a digital compressing circuit 82. The output data of the digital compressing circuit 82 and the input digital video signal are supplied to an adder 83. The output digital signal is outputted from the adder 83.

Figure 3A:
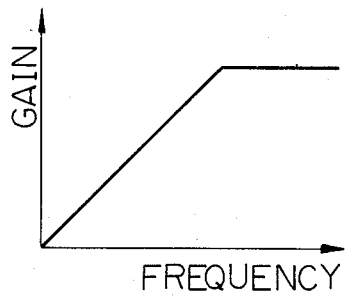
FIGS. 3A, 3B and 3C show graphs which are used for explaining an embodiment of the invention.
Figure 3B:
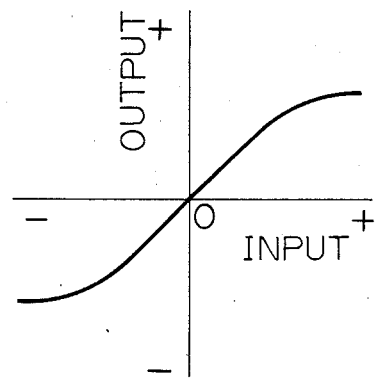
Figure 3C:
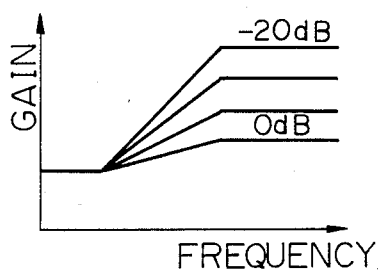

As shown in FIG. 3A, the digital high-pass filter 81 has a frequency characteristic such that the gain increases as the frequency becomes higher. On the other hand, as shown in FIG. 3B, the digital compressing circuit 82 has a non-linear compression characteristic such that it generates the output data having the same amplitude as the input data when the amplitude of the input data is small and it generates the output data having a smaller amplitude than that of the input data when the amplitude of the input data is large. Therefore, as shown in FIG. 3C, the non-linear pre-emphasis circuit shown in FIG. 2 has a characteristic such that the pre-emphasis amount becomes maximum in the region where the amplitude of the input digital video signal is small and the pre-emphasis amount decreases with an increase in its amplitude.

Figure 4:
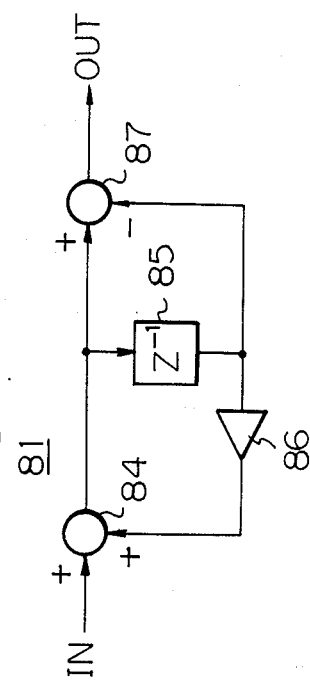
FIG. 4 is a block diagram showing an example of a digital high-pass filter.

The digital high-pass filter 81 is the digital filter substituted for the analog high-pass filter having a desired frequency characteristic by means of a bilinear transforming method (one of the methods of designing a digital filter). As an example, the digital filter having an arrangement shown in FIG. 4 can be used. FIG. 4 shows the digital filter in the case where the input data is formed of one bit for simplicity. The digital high-pass filter 81 comprises: an adder 84 to which the input data is supplied as one input; a delay circuit 85 to which the delayed output which was obtained by delaying the output of the adder 84 by one sampling period (e.g., 70 nsec) is supplied as the other input of the adder 84 through a coefficient multiplier 86; and a subtractor 87 to which the output of the adder 84 and the output of the delay circuit 85 are supplied. A desired frequency characteristic is obtained in dependence upon a coefficient which is supplied to the coefficient multiplier 86.

Figure 5:
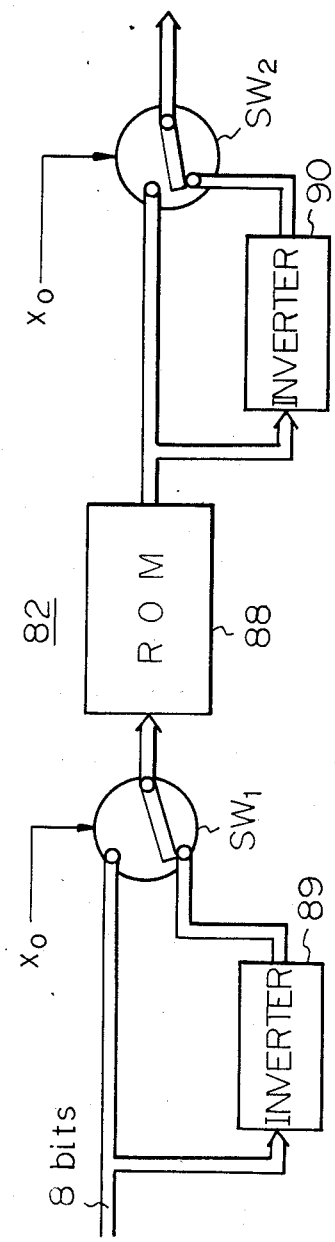
FIG. 5 is a block diagram showing an example of a digital compressing circuit.

An example of the digital compressing circuit 82 is shown in FIG. 5. In FIG. 5, numeral 88 denotes a ROM in which the data conversion table corresponding to the part of the positive polarity of the data compression characteristic is written. The input digital video signal is directly supplied to or it is supplied through a polarity inverter 89 to the ROM 88 as an address input thereof.

The read output of the ROM 88 is directly outputted or it is outputted through a polarity inverter 90.

The input digital video signal is the 2's complementary code signal. In case of the eight-bit code signal, it can have 255 different values within a range of ($-127 \sim 0 \sim +127$). As shown in FIG. 6, the part P of the positive polarity of the data compression characteristic (refer to FIG. 2B) is written in the addresses 0 to 127 in the ROM 88.

The positive values included in the range of 0 to 127 of the input digital video signal are supplied directly to the ROM 88 as address inputs thereof without inverting the polarity, and at the same time the readout output of the ROM 88 is obtained as an output without inverting the polarity. On the other hand, negative values P' included in the range of $-1$ to $-127$ of the input digital video signal are supplied to the ROM 88 as address inputs thereof after the polarity was inverted by the polarity inverter 89. The read output from the ROM 88 is obtained as an output after the polarity is inverted by the polarity inverter 90 (in this case, P' denotes virtual ROM data). The polarity inversion is controlled using the most significant bit MSB (called a sign bit) of the input digital video signal.

In addition, $SW_1$ and $SW_2$ of FIG. 5 are change-over switches to select whether the video signal is directly transmitted or is transmitted through the inverters 89 and 90.

Figure 7:
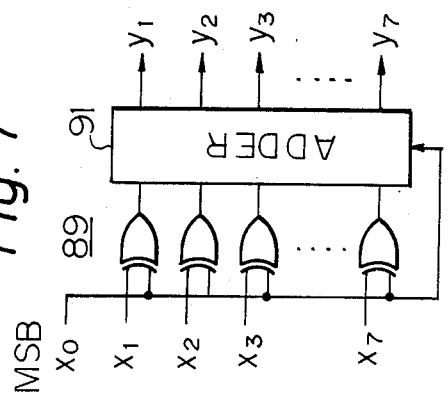

FIG. 7 shows an example of the polarity inverter 89. Assuming that one sample of the input digital signal is formed of ($X_0, X_1, X_2, \ldots, X_7$) (where, $X_0$ is the MSB and $X_7$ is the LSB), seven exclusive OR gates to which the MSB $X_0$ is supplied are provided and the lower significant seven bits $X_1, X_2, \ldots,$ and $X_7$ are respectively supplied to these exclusive OR gates. The MSB $X_0$ is added by an adder 91 to the output of the exclusive OR gate to which the LSB $X_7$ is supplied among those exclusive OR gates. Seven bits ($y_1, y_2, \ldots, y_7$) of the output of the adder 91 are the bits that were inverted to the positive bits when the MSB is "1", namely, the input is negative and are the same bits as the input when the MSB is "0", that is, the input is positive. Although not shown, the polarity inverter 90 to which the read output from the ROM 88 is supplied also has an arrangement similar to that of FIG. 7.

The memory capacity can be reduced to half by storing the data conversion table of one polarity into the ROM 88. In addition, in place of the ROM 88, another arrangement may be adopted whereby a RAM is used and the data conversion table calculated by a microprocessor or the like is written into this RAM.

Figure 8:
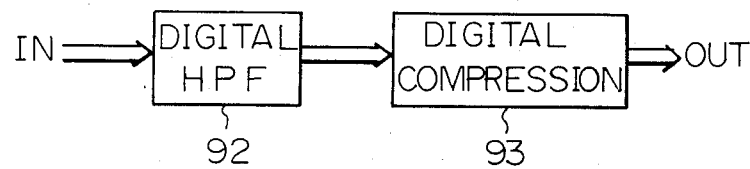
FIG. 8 is a block diagram of another embodiment of the invention.
Figure 9:
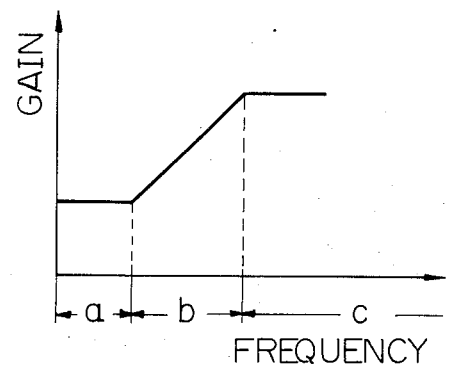
FIGS. 9 and 10 are a graph showing the characteristic of a digital high-pass filter which is used in another embodiment of the invention and a block diagram of the same, respectively.

FIG. 8 shows another example of a non-linear digital pre-emphasis circuit to which the invention is applied. Different from the arrangement shown in FIG. 2, this example has one data transmission line. Namely, the input digital video signal is provided as an output through a digital high-pass filter 92 and a digital compressing circuit 93. The digital compressing circuit 93 does not perform the compression in the region at a lower level but performs the compression of the input level at a higher level in a similar manner as in the foregoing digital compressing circuit 82. On the one hand, as shown in FIG. 9, the digital high-pass filter 92 has a frequency characteristic such that the gain is constant in a region a to the first frequency and the gain increases in a region b from a frequency higher than the first frequency to the second frequency. The gain is again constant in a region c higher than the second frequency.

Figure 10:
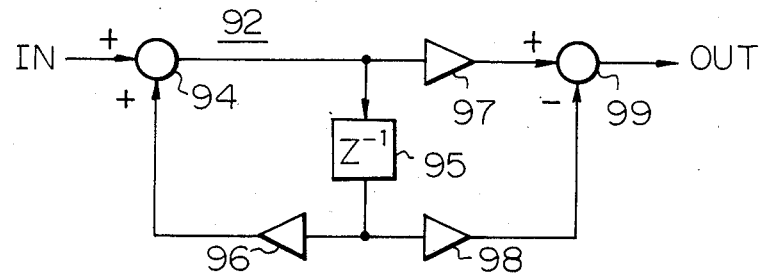

Therefore, with the arrangement shown in FIG. 8, the characteristic (FIG. 3C) similar to that of the foregoing non-linear pre-emphasis circuit can be realized. As the digital high-pass filter 92 having the frequency characteristic shown in FIG. 9, a filter having such an arrangement as shown in FIG. 10 can be employed. FIG. 10 shows the filter in the case where the input data consists of one bit for simplicity. The digital high-pass filter 92 comprises: an adder 94 to which the input data is supplied as one input; a delay circuit 95 which delays the output of the adder 94 by one sampling period and supplies the delayed output through a coefficient multiplier 96 as the other input of the adder 94; and a subtractor 99 which receives the data from the output of the adder 94 transmitted through a coefficient multiplier 97 and the data from the output of the delay circuit 95 transmitted through a coefficient multiplier 98. A desired frequency characteristic can be derived in dependence upon the coefficients which are supplied to the coefficient multipliers 96, 97, and 98. In addition, although the non-linear pre-emphasis has been described in the embodiments of the invention, the concept of the invention may be applied to an expanding circuit of a digital de-emphasis circuit.

According to the present invention, a non-linear pre-emphasis circuit can be formed by only a digital circuit and it is possible to realize a non-linear pre-emphasis circuit in which an error, a time change, and a temperature change of the characteristic are not caused and no adjustment for the characteristic is needed. This differs from a conventional circuit using an analog circuit element such as L, R, and C, etc. The invention is suitable for construction as an integrated circuit.

Although the present invention has been shown and described with respect to preferred embodiments, various changes and modifications which are obvious to a person skilled in the art to which the invention pertains are deemed to lie within the spirit and scope of the invention.

We claim as our invention:

1. A non-linear digital emphasis circuit for non-linearly emphasizing a high frequency component of a digital video signal in accordance with an amplitude of said digital video signal, comprising:
    a digital filter means for emphasizing the high frequency component of said digital video signal; and
    a memory means containing a data conversion table for non-linearly compressing the amplitude of the digital video signal, and to which the digital video signal is supplied as an address input.

2. An emphasis circuit according to claim 1 wherein said data conversion table has a compression characteristic for said digital video signal and said video signal has digital words representing a range of positive and negative polarity values, and wherein a polarity inverter means is provided for inverting the respective digital address so as to represent the negative values at the address input of said memory means and also a polarity inverter means is provided at a read output therefrom for inverting a digital output, both of said inverter means being engaged depending upon a polarity indication in said digital video signal.

3. An emphasis circuit according to claim 2 wherein said polarity inverter means is engaged depending upon a detection of a positive or negative polarity indication of a most significant bit of the input digital video signal.

4. An emphasis circuit according to claim 1 wherein inverter means are provided at an input and an output of the memory, said inverter means being operable on each bit of a two's complement digital signal so as to change a "0" to a "1" or vice versa depending upon a control bit contained in the digital video signal input being input to the memory means.

5. An emphasis circuit according to claim 1 wherein the digital video signal is first connected to the digital filter means and an output thereof is connected to the memory means.

6. An emphasis circuit according to claim 5 wherein an adder is provided at an output of the memory means having as a first input the input digital video signal and as a second input an output of the memory means.

7. A non-linear digital emphasis circuit for non-linearly emphasizing a high frequency component of a digital video signal in accordance with an amplitude of the digital video signal, comprising:
digital filter means connected to receive the digital video signal and designed as a digital high-pass filter;
digital compression means connected to receive the digital signal at an output of the digital filter means for emphasizing the digital video signal for relatively smaller amplitude inputs and for de-emphasizing the digital video signal for relatively larger amplitude inputs; and
said digital compression means having a memory means containing a data conversion table for non-linearly compressing the amplitude of the input digital video signal, said memory means being addressed by the digital video signals being input.

8. A method for non-linearly emphasizing a high-frequency component of a digital video signal in accordance with an amplitude of said digital video signal, comprising the steps of:
processing the digital video signal with a digital high-pass filter;
digitally compressing the digital signal for emphasizing the digital video signal for relatively smaller amplitude inputs and for de-emphasizing the digital video signal for relatively larger amplitude inputs; and
providing a memory containing a data conversion table for non-linearly compressing the amplitude of the input digital video signal by addressing the memory with the digital video signals.

* * * * *